Oct. 26, 1965  E. B. ARENSON  3,213,715
INDEXING MECHANISM
Filed Aug. 9, 1961  2 Sheets-Sheet 1
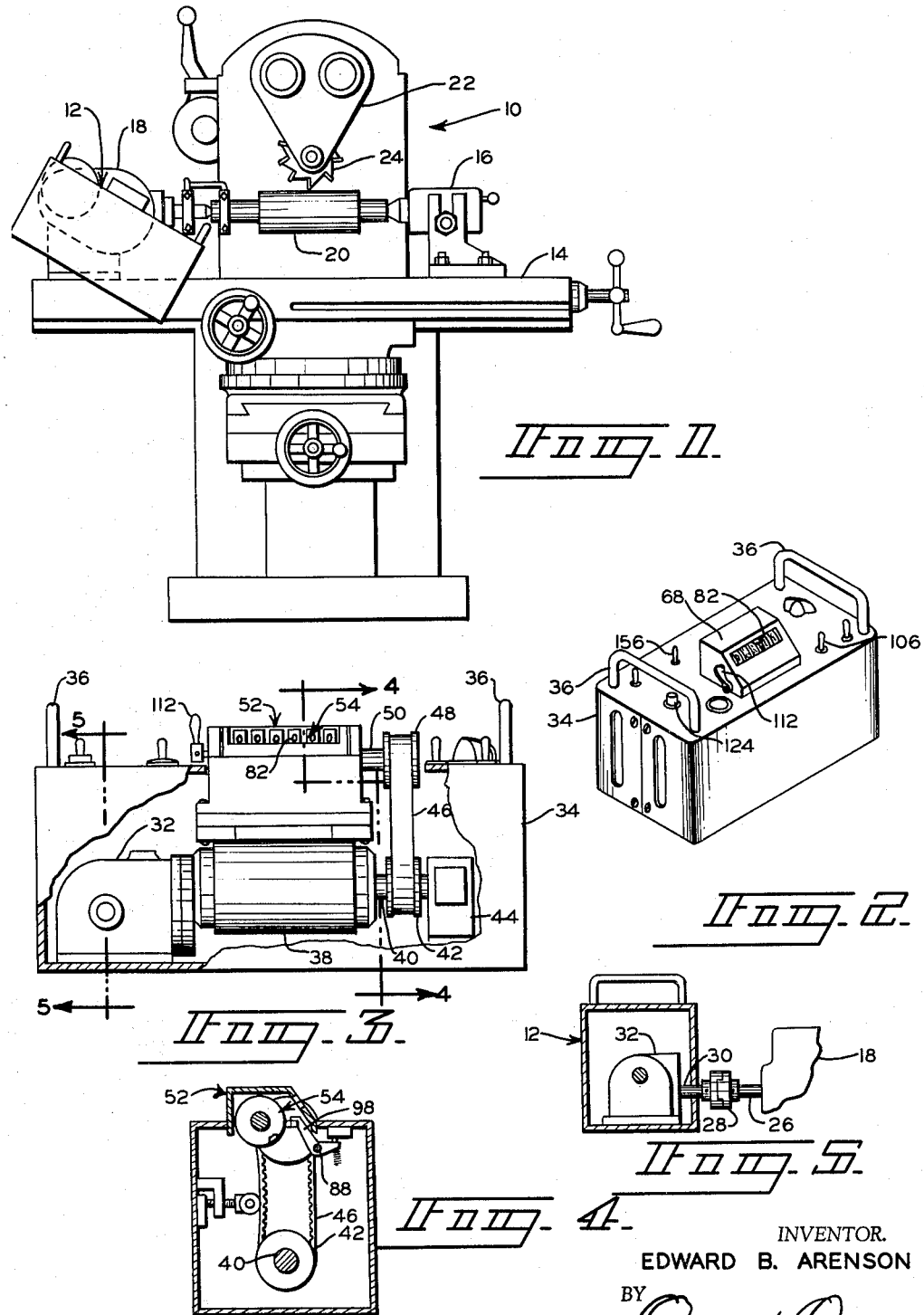
INVENTOR.
EDWARD B. ARENSON
BY
Owen & Owen
ATTORNEYS Oct. 26, 1965
E. B. ARENSON
3,213,715
INDEXING MECHANISM
Filed Aug. 9, 1961
2 Sheets-Sheet 2
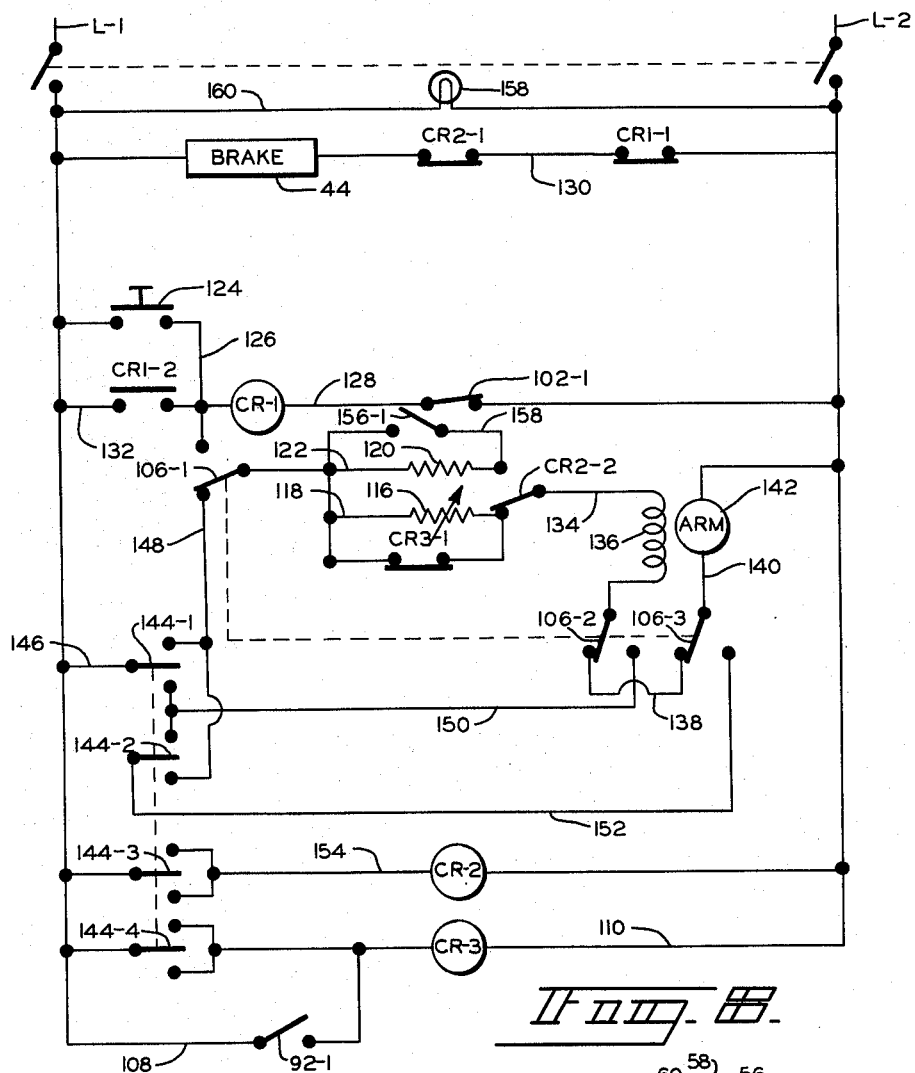
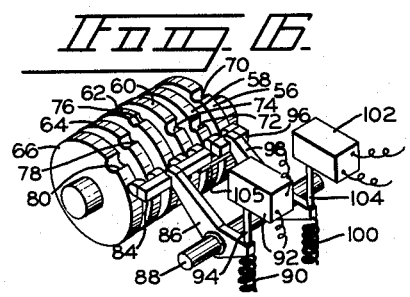
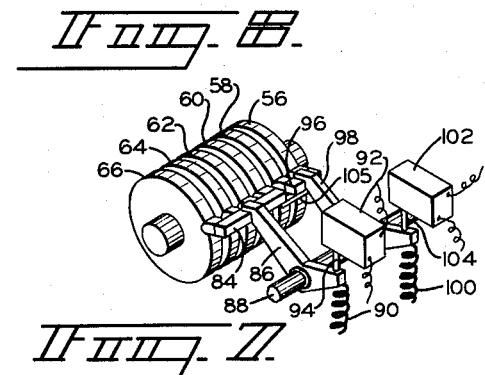
INVENTOR.
EDWARD B. ARENSON
BY
ATTORNEYS

United States Patent Office 3,213,715
Patented Oct. 26, 1965

3,213,715
INDEXING MECHANISM
Edward B. Arenson, 3880 Brookside, Toledo, Ohio
Filed Aug. 9, 1961, Ser. No. 130,339
5 Claims. (Cl. 74—821)

This invention relates to an indexing mechanism unit and more particularly to such a mechanism unit for rotating a shaft a predetermined number of revolutions in order to move a workpiece or tool to a predetermined position.

Many devices are now well known in the art for indexing machine components or for moving the components to predetermined positions. Such devices are usually made an integral part of the machine and cannot be employed on any other one. Further, such devices, particularly those adapted to fit more than one machine, are very expensive, intricate mechanisms requiring both high initial costs and high upkeep. These indexing devices, as heretofore known, additionally are of substantial size and are very heavy.

The present invention provides an improved indexing mechanism unit which is adaptable for many machines, in fact almost any machine employing a component which can be manually rotated or indexed. In such an instance, the new indexing mechanism unit simply is attached to an indexing shaft when the handle thereof is removed, after which operation can be commenced immediately. The new indexing unit costs only a fraction of those heretofore known and is substantially smaller, lighter, and less complicated, thereby resulting in many advantages. The new unit can also be calibrated for a particular machine in terms of degrees so that an angular position can be set readily. The degree setting can even be broken down into minutes and seconds, if desired.

The indexing mechanism unit can drive the indexing shaft or other member at both high and low speeds and in forward and reverse directions. It can also be operated in an automatic or a manual manner to provide adaptability for almost any conditions. Further, the new indexing device is extremely simple to operate because it only requires the setting of a counter and the pressing of a reset button to initiate operation. There is no need to count the number of turns or a number of holes in a plate, for example, as required with many indexing or dividing heads now known.

It is, therefore, a principal object of the invention to provide an improved, inexpensive indexing mechanism unit having the many advantages set forth above.

Other objects and advantages of the invention will be apparent from the following detailed description of a preferred embodiment thereof, reference being made to the accompanying drawing, in which:

FIG. 1 is a view in elevation of a milling machine on which an indexing mechanism unit according to the invention is mounted;

FIG. 2 is a view in perspective of the indexing mechanism unit shown in FIG. 1;

FIG. 3 is a front view of the indexing mechanism unit with part of the casing broken away to show interior components thereof;

FIG. 4 is a view in cross section taken along the line 4—4 of FIG. 3;

FIG. 5 is a fragmentary view in cross section taken along the line 5—5 of FIG. 3;

FIG. 6 is a view in perspective of part of a counter constituting part of the indexing mechanism unit, at the beginning of operation;

FIG. 7 is a view in perspective of the part of the counter shown in FIG. 6, but at the end of an operation; and FIG. 8 is a diagrammatic view of a circuit employed in the indexing mechanism unit of the invention.

Referring to the drawings, and more particularly to FIG. 1, a milling machine indicated at 10 is exemplary of a machine with which an indexing mechanism unit indicated at 12, embodying the principles of the invention, can be used. The machine 10 includes a table 14 upon which is mounted a tailstock 16 and a headstock 18 for rotatably carrying a workpiece 20. Above the workpiece 20 is an arbor yoke 22 which carries and drives a cutter 24. An indexing shaft 26 (FIG. 5) extends from the headstock 18 and is usually manually rotated to change the position of the workpiece 20 with respect to the cutter 24. A conventional dividing head is usually mounted on the shaft 26 for this purpose. However, in place of the dividing head is a suitable coupling 28 which connects the indexing shaft 26 with a driving shaft 30 mechanically connected with a gear reducer 32 located within a casing 34 of the indexing mechanism unit 12. All of the components of the indexing unit 12 are located within or on the casing 34 which also is provided with a pair of handles 36 to provide maximum portability for the unit, which can weigh less than eighteen pounds.

As shown in FIG. 3, the gear reducer 32 is connected to a small electric motor 38 which drives the reducer 32 through a motor drive shaft 40 extending completely through the motor 38. Affixed to the end of the motor shaft 40 opposite the gear reducer is a timing belt sheave 42 and beyond the sheave 42 is an electric brake 44. A timing belt 46 engages the sheave 42 and also an upper sheave 48 which is mounted on a counting shaft 50 extending outwardly from a counter 52 which is mounted on the motor 38 and extends upwardly beyond the top of the casing 34 so as to be readily observable and accessible. The counter 52 is of a standard design with the exception of some modifications hereinafter to be set forth.

The preferred gear reduction employed in the present invention requires that the motor shaft turn 71,400 times for each revolution of the work. Thus the 360° periphery of a work piece surface is subdivided into 71,400 parts and very accurate settings can be made.

The counter 52 causes the brake 44 to be set after a predetermined number of revolutions of the shaft 40 have been counted. The brake thereupon immediately stops the motor shaft 40 and, of course, the drive shaft 30. Because the motor shaft 40 rotates at a much higher rate than the shaft 30, very close control over the stopping of the shaft 30 can be accomplished. Even if the motor shaft 40 is stopped slightly from its exact desired position, only a fractional amount of this error will be transmitted to the shaft 30 because of the geared-down ratio therebetween. Thus, the placement of the brake 44 on the high speed motor shaft 40 rather than on the drive shaft 30 constitutes an important advancement over indexing mechanisms heretofore known which have employed the brake on the slow speed shaft rather than upon the high speed motor shaft.

Referring in more detail to the counter 52, the driven counting sheave 48 is connected to a counting disc assembly indicated at 54 by suitable mechanism and mechanical connections as is well known in the art. The assembly 54 comprises a plurality of counting discs 56–66, each of which is numbered from 0 to 9. The disc 56 indicates units; the disc 58 indicates tens; the disc 60 indicates hundreds; the disc 62 indicates thousands; the disc 64 indicates ten-thousandths; and the disc 66 indicates hundred-thousandths. Of course, more or fewer discs may be employed according to particular needs. The discs can be manually set to a desired number of an operator, simply by raising a counter cover 68 and manually moving the discs to the desired number.

It may be noted from FIGS. 6 and 7 that the discs 56–66 have notches 70–80, respectively, each of which lies in a predetermined circumferential position when its disc indicates zero through a window 82 of the casing 68. With all zeros appearing through the window 82, the notches 70–80 are in alignment, as shown in FIG. 7. When the notches are thus aligned, the brake 44 is set and the motor 38 is immediately stopped.

To provide more accurate stopping of the motor 38, and thus more accurate indexing, the speed of the motor 38 is reduced before the desired stopping point, preferably about 100 revolutions therebefore. This can be accomplished as follows: Suppose, for example, that it is desired that the shaft 40 of the motor 38 rotate 23,213 times before the motor stops, it being predetermined that this number of revolutions will move the workpiece 20 to the next desired position. The cover 68 is then raised and the discs are set so that the number 23,213 is observable through the window 82. When the unit is started, the discs begin to count down to zero, decreasing one number for each revolution of the motor shaft 40. When the number on the dials drops to 99, the four discs 60–66 will read zero and their corresponding four notches 74–80 will be in alignment. When this occurs, a feeler or bar 84 carried on a first arm 86 will drop into the corresponding notches, the arm 86 being rotatably mounted on a pivot rod 88 and urged toward the discs by a spring 90.

When the bar 84 drops into the notches, a first or slow down limit switch 92 is actuated through a switch pin 94 in contact with the arm 86. The switch 92 thereupon causes the motor 38 to slow down, as will be discussed in more detail subsequently, whereby the motor can be more accurately stopped 99 revolutions later when all of the discs, including the discs 56 and 58 read zero through the window 82. When this occurs, the notches 70 and 72 of the discs 56 and 58 fall into alignment with the notches 74–80 whereupon a bar 96 of a second feeler or stop arm 98 falls into the notches. This arm 98 also is pivotally mounted on the pivot rod 88 and is urged toward the discs by means of a spring 100. This movement of the arm 98 actuates a switch 102 through a switch pin 104 which actuates the brake 44 and stops the motor completely and quickly.

A connecting bar 105 is affixed to the bar 96 and rides against the back of the bar 84 so that the bar 96 cannot possibly drop into the notches 70 and 72 until the bar 84 has dropped into the notches 74–80. Otherwise, the switch 102 could be prematurely actuated at any number ending in double zeros such as 13,300 or 200, by way of example, when the notches 70 and 72 are aligned.

The operation of the over-all indexing unit will be described in connection with the wiring diagram shown in FIG. 8. Before operation is commenced, an automatic-manual, three-pole switch 106 (FIG. 8), the poles being designated 106–1, 106–2, and 106–3, is placed in the atuomatic position with the poles shown in solid lines in FIG. 8. The slow speed switch 92, the contacts 92–1 of which are located in a by-pass line 108, is then opened to deactivate a control relay CR3 located in a line 110, the switch 92 being previously closed during a prior cycle of the counter 52. Opening of this switch is accomplished by means of a lever 112 located on one end of the counter 52, as shown in FIGS. 2 and 3. Deactivation of the control relay CR3 causes its normally-closed contacts CR3–1 in a resistance by-pass line 114 to close and establish a by-pass around a variable resistance 116 located in a line 118. The resistance 116 is connected in series with the motor by contacts CR2–2 when a relay CR2, to be discussed subsequently, is deenergized. When this relay is energized, the contacts CR2–2 connect the motor with a fixed resistance 120 located in a line 122.

After the slow speed switch 92 is opened, a start switch 124 in a by-pass line 126 is closed to actuate a control relay CR1 in a line 128. The control relay CR1 then opens its normally-closed contacts CR1–1 in a line 130 which releases the brake 44 to enable rotation of the motor shaft 40. The control relay CR1 also closes its normally-open contacts CR1–2 in a line 132 to hold the relay CR1 in and to supply current through the poles 106–1 of the automatic-manual switch. Current thereby flows through the by-pass line 114, the contacts CR2–2 in a line 134, a field coil 136 of the series-wound motor 38, the poles 106–2 of the automatic-manual switch, a connecting line 138, the poles 106–3 of the automatic-manual switch, a line 140, and an armature 142 of the motor 38.

The motor will then run at high speed until the four notches 74–80 are aligned and the bar 84 drops thereinto. The switch 92 thereupon closes to actuate the control relay CR3 and to open the contact CR3–1. The motor 38 immediately slows down because the resistance 116 is now in series with the motor. Slow speed operation then continues while the discs 56 and 58 rotate through the final 99 revolutions until the notches 70 and 72 are aligned and allow the bar 96 to drop thereinto and actuate the switch 102. The switch 102 has contacts 102–1 located in the line 128 which are opened when the last two discs 56 and 58 reach zero. This deactivates the control relay CR1 which closes the normally-closed contact CR1–1 to actuate the brake 44 and also to open the normally-open contacts CR1–2 and shut off the motor 38 by stopping current flow to the field 136 and the armature 142.

For manual operation, the switch 106 is moved to the second position with the poles moved to the positions shown in dotted lines. A four-pole, forward-reverse switch is then moved to an upper position with poles 144–1, 144–2, 144–3, and 144–4 moved upwardly. This connects a line 146 to a line 148 and supplies current through the poles 106–1 and to the field 136, as before. Beyond the field 136, a patch is established through the poles 106–2 to a line 150, the poles 144–2, and a line 152 back to the line 140 and the armature 142. At the same time, the poles 144–3 connect line current to a line 154 to actuate the control relay CR2 which opens normally-closed contacts CR2–1 in the line 130 to release the brake 44. The contacts CR2–2 also then connect the fixed resistance 120 into the circuit. The poles 144–4 in the upper position connect the line 110 to line current to actuate the relay CR3 and open the contacts CR3–1 to prevent the possibility of a direct path of current through the line 114 to the motor. The workpiece 20 can then be "inched along" by moving the four-pole switch 144 between the upper position and a neutral position, as shown in solid lines in FIG. 8.

For reverse operation of the workpiece 20 and the motor 38, the four-pole switch is moved downwardly so that the poles 144–1 now connect the line 146 with the line 150 which supplies current in the reverse direction through the poles 106–2 and the field 136. The path of current is then continued through the line 148 to the poles 144–2, the line 152, the poles 106–3, the line 140, and the armature 142. The reverse direction of current through the field 136 reverses the direction of the motor. The poles 144–3, when in the downward position, again actuate the control relay CR2 to open the contact CR2–1 and release the brake 44 and also to actuate the contacts CR2–2 and connect the resistance 120 into the circuit. The poles 144–4 in the downward position also actuate the relay CR3 to maintain the contacts CR3–1 open.

During manual operation, if it is desired to operate the motor 38 at high speed, a manual high speed by-pass switch 156 with contacts 156–1 in a line 158 can be closed to by-pass the resistance 120.

A pilot light 158 in a line 160 indicates when power is supplied to the unit.

Various modifications of the above described embodiment of the invention will be apparent to those skilled in the art and it is to be understood that such modifications can be made without departing from the scope of the invention if they are within the spirit and tenor of the accompanying claims.

I claim:

1. An indexing mechanism comprising a gear reducer, a driving shaft extending from said gear reducer, means for coupling said shaft with an indexing shaft of a machine for driving a component carried thereby, a variable speed motor, a motor shaft driven by said motor and connected to said gear reducer to drive said driving shaft, an electrically-operated brake effective to stop rotation of said motor shaft, a counter including at least three discs for indicating at least units, tens and hundreds digits, means connecting said discs to said motor shaft for rotating said discs in response to the rotation of said shaft, said discs having notches therein located to be in alignment when all of said discs read zero, a bar lying adjacent and urged toward all of said discs except one indicating units digits and one indicating tens digits, a switch operated by said bar and responsive to the position of said bar for reducing the speed of said motor when said bar is in the notches of its associated discs, a second bar lying adjacent and urged toward the latter two discs indicating the units and tens digits, a second switch operated by said second bar and responsive to the position of said second bar for actuating said brake to stop said motor when said second member is in its associated notches, and means extending between said bars for preventing said second bar from moving into its associated notches until said first bar is in its associated notches.

2. An indexing mechanism comprising a gear reducer, a driving shaft extending from said gear reducer, means for coupling said shaft with an indexing shaft of a machine for driving a component carried thereby, a variable speed motor, a motor shaft driven by said motor and connected to said gear reducer to drive said driving shaft, an electrically-operated brake effective to stop rotation of said motor shaft, a counter including a plurality of discs, means connecting said discs to said motor shaft for rotating said discs in response to the rotation of said motor shaft, said discs having notches thereon located to be in predetermined positions when all of said discs read zero, means responsive to notches in some of said discs and lying adjacent and urged toward all of said discs except one indicating units digits and one indicating tens digits, a switch operated by said responsive means according to the position thereof for reducing the speed of said motor when the notches of its associated discs are in the predetermined positions, second means responsive to the notches in said tens and units discs and lying adjacent and urged toward the discs indicating the tens and units digits, a second switch operated by said second responsive means according to the position thereof for actuating said brake to stop said motor when the associated notches of its associated discs are in the predetermined positions, and means associated with said first and second responsive means for preventing operation of said second switch until said first switch has been operated.

3. An indexing mechanism for moving a component of a machine a predetermined amount, said mechanism including a variable speed motor, a motor shaft driven by said motor, means for connecting said motor shaft to said machine component, brake means effective to stop rotation of said motor shaft, a counter including a plurality of discs, means connecting said discs to said motor shaft to enable said discs to rotate in response to the rotation of said shaft, said discs having means thereon located to be in predetermined positions when all of said discs read a predetermined number, means responsive to said disc means of some of said discs and lying adjacent and urged toward its associated discs, except one indicating units digits and one indicating tens digits, a first switch operated by said responsive means for reducing the speed of said motor when said discs means of its associated discs are in the predetermined positions, second means responsive to the disc means of said tens and units discs and lying adjacent and urged toward its associated discs indicating the tens and units digits, a second switch operated by said second responsive means for actuating said brake means to stop said motor shaft when the associated disc means of its associated discs are in the predetermined positions, and means associated with said first and second responsive means for preventing operation of said second switch until said first switch has been operated.

4. An indexing mechanism for moving a component of a machine a predetermined amount, said mechanism including a variable speed motor, a motor shaft driven by said motor, means for connecting said motor shaft to said machine component, brake means effective to stop rotation of said motor shaft, a counter including a plurality of discs indicating at least tens and units digits, means connecting said discs to said motor shaft to enable said discs to rotate in response to the rotation of said shaft, said discs having means thereon located to be in predetermined positions when all of said discs read a predetermined number, means responsive to said disc means of at least one of said discs and lying adjacent and urged toward its associated discs, a first switch operated by said responsive means for reducing the speed of said motor when said discs means of its associated discs are in the predetermined positions, second means responsive to the disc means of said units disc and lying adjacent and urged toward its associated disc indicating the units digit, a second switch operated by said second responsive means for actuating said brake means to stop said motor shaft when the associated disc means of its associated discs are in the predetermined positions, and means associated with said first and second responsive means for preventing operation of said second switch until said first switch has been operated.

5. A device for turning a power driven shaft a predetermined number of revolutions, said device comprising brake means effective to stop said shaft, power means for driving said shaft, a counter including a plurality of discs, means for connecting said discs to said power shaft for rotating said discs in response to the rotation of said shaft, said discs being numbered to count the revolutions of said shaft, a notch in each of said discs located to be in predetermined positions when said discs indicate a predetermined number, responsive means lying adjacent and urged toward at least one of said discs, means responsive to the position of said responsive means for reducing the speed of said power means when said responsive means is in the notch of its associated disc, second responsive means lying adjacent and urged toward at least one other of said discs, and means responsive to the position of said second responsive means for actuating said brake means to stop said power shaft when said second responsive means is in the notch of its associated disc.

References Cited by the Examiner
UNITED STATES PATENTS

| 853,119 | 5/07 | Rodgers | 58—19 |
|---|---|---|---|
| 1,685,481 | 9/28 | Dehart. | |
| 2,046,304 | 6/36 | Brubaker et al. | |
| 2,581,859 | 1/52 | Hoye | 235—132 |
| 2,979,972 | 4/61 | Danly | 74—821 |
| 3,130,358 | 4/64 | Lang | 318—371 |

FOREIGN PATENTS

| 689,391 | 5/30 | France. |
|---|---|---|
| 660,695 | 11/51 | Great Britain. |

BROUGHTON G. DURHAM, *Primary Examiner.*